| (12) United States Patent<br>Park | (10) Patent No.: US 11,042,232 B2<br>(45) Date of Patent: Jun. 22, 2021 |
|---|---|

(54) IN-VEHICLE CONTROL APPARATUS USING DETACHABLE KNOB AND METHOD OF CONTROLLING THE SAME

(71) Applicants: Hyundai Motor Company, Seoul (KR); Kia Motors Corporation, Seoul (KR)

(72) Inventor: Jong Hwa Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/700,497

(22) Filed: Dec. 2, 2019

(65) Prior Publication Data

US 2020/0174587 A1 Jun. 4, 2020

(30) Foreign Application Priority Data

Dec. 3, 2018 (KR) .................. 10-2018-0153766

(51) Int. Cl.
| G06F 3/0362 | (2013.01) |
| G06F 3/14 | (2006.01) |
| G06F 3/0488 | (2013.01) |
| G06F 3/0484 | (2013.01) |
| B60K 35/00 | (2006.01) |
| B60K 37/00 | (2006.01) |
| B60K 37/06 | (2006.01) |

(52) U.S. Cl.
CPC .......... G06F 3/0362 (2013.01); B60K 35/00 (2013.01); B60K 37/06 (2013.01); G06F 3/04847 (2013.01); G06F 3/04886 (2013.01); G06F 3/1423 (2013.01); *B60K 2370/1438* (2019.05); *B60K 2370/164* (2019.05); *B60K 2370/166* (2019.05); *B60K 2370/27* (2019.05); *G06F 2203/04803* (2013.01); *G06F 2203/04804* (2013.01)

(58) Field of Classification Search
CPC .............. G06F 3/0362; G06F 3/04847; G06F 3/04886; G06F 3/1423; B60K 35/00; B60K 37/06
See application file for complete search history.

(56) References Cited

U.S. PATENT DOCUMENTS

| 10,705,629 B1* | 7/2020 | Arnold | G06F 3/016 |
| 2018/0154774 A1* | 6/2018 | Park | G06F 3/038 |
| 2018/0370365 A1* | 12/2018 | Lee | B60K 35/00 |
| 2018/0373350 A1* | 12/2018 | Rao | G06F 3/038 |
| 2020/0117288 A1* | 4/2020 | Lopez | G06F 3/0393 |
| 2020/0272190 A1* | 8/2020 | Von Euler | H04R 1/028 |

* cited by examiner

*Primary Examiner* — Sardis F Azongha
(74) *Attorney, Agent, or Firm* — Slater Matsil, LLP (57) ABSTRACT

A method of controlling a vehicle uses a detachable knob. The method includes detecting whether the detachable knob is attached to a first display of an audio video navigation (AVN) system. The first display includes a number of regions. Information on a controlled function corresponding to one of the regions to which the detachable knob is attached is transmitted from the AVN system to the detachable knob. A first user interface corresponding to the information the controlled function is output on a second display of the detachable knob. Result information according to an operation of the detachable knob is transmitted from the detachable knob to the AVN system. The controlled function is controlled based on the result information in the AVN system.

20 Claims, 10 Drawing Sheets

IN-VEHICLE CONTROL APPARATUS USING DETACHABLE KNOB AND METHOD OF CONTROLLING THE SAME

CROSS-REFERENCE TO RELATED APPLICATIONS

This application claims priority to Korean Patent Application No. 10-2018-0153766, filed on Dec. 3, 2018, which application is hereby incorporated herein by reference.

TECHNICAL FIELD

Embodiments relate to an in-vehicle control apparatus using a detachable knob and a method of controlling the same.

BACKGROUND

Vehicles released in recent years fundamentally include audio video navigation (AVN) systems or infotainment display systems and the size of the display is also increasing.

Accordingly, more information may be simultaneously displayed. In addition, as application of a virtual button or a virtual dial has gradually increased with application of a touchscreen, the number of physical knobs (e.g., buttons or dials) in an operation system has decreased.

However, since virtual buttons or virtual dials displayed on the touchscreen are displayed on a flat display, the sense of operation thereof is lower than that of a physical knob. In addition, problems may occur in usability due to touch misrecognition.

Accordingly, there is a need for a method of maintaining the advantages of the physical knob while maintaining convenience and beauty of a large-screen display.

SUMMARY

Embodiments of the present invention relate to a user interface capable of controlling various functions of a vehicle and particular embodiments relate to an in-vehicle control apparatus using a detachable knob and a method of controlling the same.

Embodiments of the present invention are directed to an in-vehicle control apparatus using a detachable knob and a method of controlling the same that substantially obviate one or more problems due to limitations and disadvantages of the related art.

Embodiments of the present invention can provide an in-vehicle control apparatus having a more convenient knob and a method of controlling the same.

Embodiments of the present invention can provide an in-vehicle control apparatus capable of controlling various vehicle functions using a detachable knob, and a method of controlling the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

In one example, a method of controlling a vehicle using a detachable knob includes detecting whether the detachable knob is attached to a first display in an audio video navigation (AVN) system including the first display including a plurality of regions, transmitting information on a controlled function corresponding to a region, in which the detachable knob is attached, among the plurality of regions from the AVN system to the detachable knob, outputting a first user interface corresponding to the information on the controlled function on a second display of the detachable knob, when an operation unit provided in the detachable knob is operated, transmitting result information according to the operation from the detachable knob to the AVN system, and controlling the controlled function based on the result information in the AVN system.

In another aspect of the present invention, a vehicle control apparatus using a detachable knob includes an audio video navigation (AVN) system including a first display including a plurality of regions, and the detachable knob attached to the first display and including a second display and an operation unit. When detecting that the detachable knob is attached to the first display, the AVN system transmits information on a controlled function corresponding to a region, in which the detachable knob is attached, among the plurality of regions to the detachable knob, the detachable knob outputs a first user interface corresponding to the information on the controlled function on the second display and, when the operation unit is operated, the detachable knob transmits result information according to the operation to the AVN system, and the AVN system controls the controlled function based on the result information.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3B is a display state view showing an example of a form in which display information is displayed according to the region configuration of FIG. 3a;

FIG. 6, which includes FIG. 7, which includes

DETAILED DESCRIPTION OF ILLUSTRATIVE EMBODIMENTS

Hereinafter, the embodiments of the present invention will be described in detail with reference to the accompanying drawings so as to be easily implemented by those skilled in the art. However, the present invention may be variously implemented and is not limited to the embodiments described herein. In the drawings, in order to clearly describe the present invention, portions which are not related to the description of the present invention will be omitted and similar portions are denoted by similar reference numerals throughout the specification.

In the entire specification, when a certain portion "includes" a certain component, this indicates that the other components are not excluded, but may be further included unless specially described. The same reference numbers will be used throughout the drawings to refer to the same or like parts.

In one embodiment of the present invention, if a detachable knob is attached in an area in which an arbitrary controlled function is displayed when an operation state of a plurality of controlled objects is displayed on a display of an AVN system, a controlled function is determined according to the attachment position and the result of control depends on operation of the detachable knob.

Figure 1:
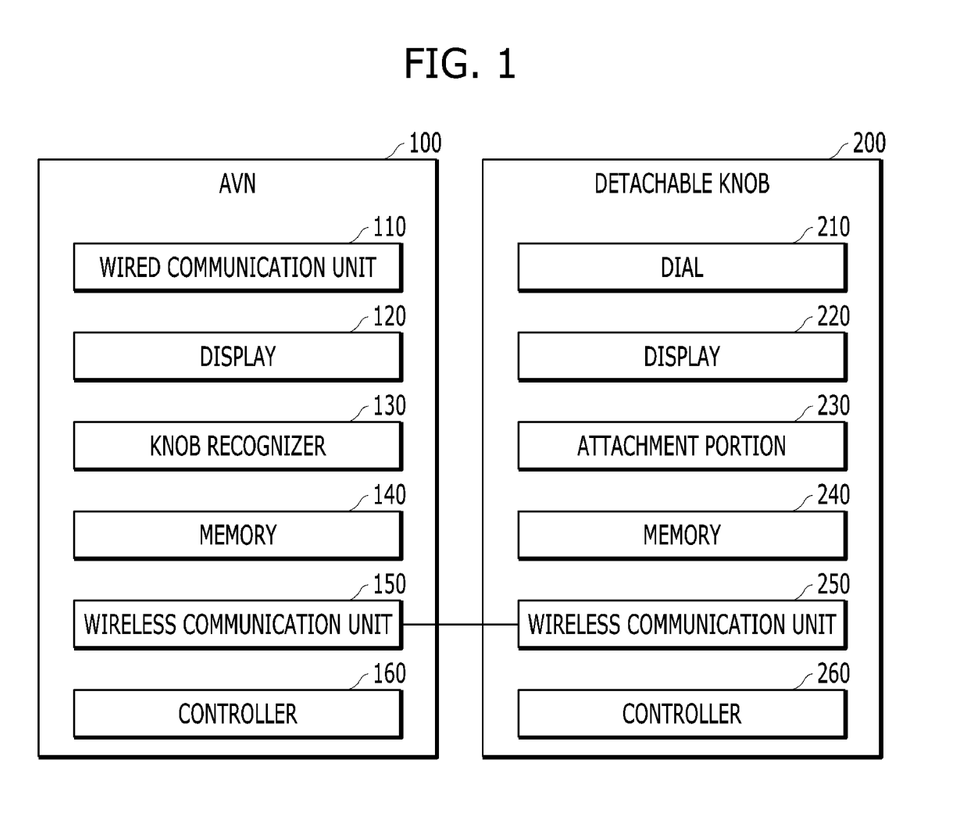
FIG. 1 is a diagram showing an example of the structure of an in-vehicle display system including a detachable knob according to an embodiment of the present invention.

First, the structure of an in-vehicle display system including a detachable knob applicable to embodiments of the present invention will be described with reference to FIG. 1. FIG. 1 is a diagram showing an example of the structure of an in-vehicle display system including a detachable knob according to an embodiment of the present invention.

Referring to FIG. 1, the in-vehicle display system according to the embodiment may include an AVN system 100 and a detachable knob 200.

The AVN system 100 may include a wired communication unit 110, a display 120, a knob recognizer 130, a memory 140, a wireless communication unit 150 and a controller 160. Hereinafter, these components will be described in detail.

The wired communication unit 110 may exchange data with a controller for controlling at least a plurality of controlled functions in the vehicle. For example, the wired communication unit 110 may support at least one of in-vehicle communication schemes such as CAN (controller area network), CAN-FD (CAN with flexible data rate), LIN (Local Interconnect Network) or Ethernet. In another example, the wired communication unit 110 may receive operation state information of an air conditioner controller for controlling an air conditioner, a body controller for controlling a convenience function such as a seat, etc. and transmit a control command.

The display 120 serves to visually output a vehicle operation state such as a navigation guidance screen, operation state information of an air conditioner system, or playback state information of a multimedia function or a variety of information necessary for a driver. If the display is a touchscreen, a virtual operation system for controlling at least some functions may be displayed and a touch command input to the virtual operation system may be detected.

The knob recognizer 130 may detect whether the detachable knob 200 is detached and the position of the detachable knob. For example, the knob recognizer 130 may include at least one of a Hall sensor for detecting magnetic force, a near field communication (NFC) transceiver for performing NFC, or a wireless charging transmitter for detecting a wireless charging receiver. That is, the detachable knob 200 may be detected by the Hall sensor if the detachable knob 200 is provided with a permanent magnet, the detachable knob 200 may be detected by the NFC transceiver if the detachable knob 200 is provided with an NFC tag, and the detachable knob 200 may be detected by the wireless charging transmitter if the detachable knob 200 is provided with the wireless charging receiver. Of course, such a detection unit is only an example and the present invention is not limited thereto.

The memory 140 may store an operating system for driving the AVN system, various application programs operating on the operating system, multimedia content, input/output control information of the AVN system, etc.

The wireless communication unit 150 may be connected to at least the wireless communication unit 250 of the detachable knob 200 using a short-range communication protocol (e.g., Bluetooth, Wi-Fi, ZigBee, NFC, etc.), thereby performing data exchange.

The controller 160 may perform overall control of the above-described components and perform determination and operation necessary to control the controlled function through interworking with the detachable knob 200 according to the embodiments of the present invention.

The detachable knob 200 may include a dial 210, a display 220, an attachment portion 230, a memory 240, a wireless communication unit 250 and a controller 260.

First, the memory 240 may store an operating system for driving the detachable knob 200, identification information of each controlled function, a graphical user interface to be displayed on a display according to the controlled function, input/output control information of the detachable knob 200, etc.

The wireless communication unit 250 may be connected to at least the wireless communication unit 150 of the AVN system 100 using a short-range communication protocol (e.g., Bluetooth, Wi-Fi, ZigBee, NFC, etc.) or a 3/4/5G protocol, thereby performing data exchange.

The controller 260 performs overall control of the above-described components and performs determination and operation necessary to control the controlled function through interworking with the AVN system 100 according to the embodiments of the present invention.

Figure 2:
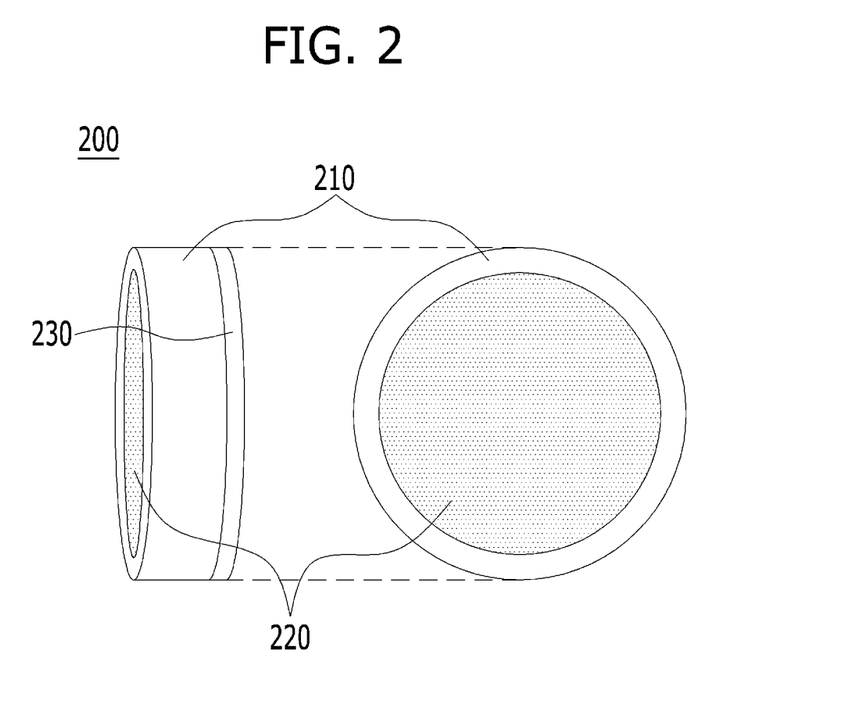
FIG. 2 is a view illustrating the appearance of a detachable knob according to an embodiment of the present invention.

The dial 210, the display 220 and the attachment portion 230 will be described with reference to FIG. 2. FIG. 2 is a view illustrating the appearance of a detachable knob according to an embodiment of the present invention.

Referring to FIG. 2, the detachable knob 200 according to the embodiment may have a cylindrical appearance. Specifically, the detachable knob 200 may have a toroidal or ring-shaped dial 210 surrounding the display 220 having a circular shape. The attachment portion 230 including a contact surface when attached to the display 120 of the AVN system 100 may be disposed on the back surface opposite the front surface of the display 220.

The dial 210 may be configured to rotate about the display 220 along the outer circumference of the dial 210, and may have a configuration in which at least one of rotation direction and a degree of rotation (e.g., displacement or angle) may be detected when a user grabs and rotates the dial. Of course, the present invention is not limited to a detailed unit or method for detecting rotation.

The display 220 has a circular appearance, and the actual display area does not necessarily correspond to an outer area defined by the inner diameter of the dial 210 and does not necessarily have a circular shape. In addition, the display 220 may be implemented as a touchscreen to receive a touch command input on the display 220 and the display 220 may be configured to include a push button function.

As described above, the attachment portion 230 may include a portion to be recognized (e.g., a magnet, an NFC tag, a wireless charging receiver, etc.) corresponding to the knob recognizer 130, and a permanent magnet may be disposed to be attached, by magnetic force, to a magnetic material (e.g., an iron plate) on the back surface of the display 120 of the AVN system 100. At this time, the magnitude of the magnetic force may be greater than rotation resistance of the dial 210 while detachment does not occur by vibration generally occurring in traveling of the vehicle when the detachable knob 200 is attached to the display 120 of the AVN system, in order to prevent a phenomenon wherein the detachable knob 200 rotates (e.g., the display 220 also rotates) without moving the dial from the viewpoint of the detachable knob 200 in the case where magnetic force is less than rotation resistance when the user rotates the dial 210.

Of course, it is apparent to those skilled in the art that the magnitude of the magnetic force may vary according to the weight of the detachable knob 200, an angle between the display 120 and the ground and the rotation resistance of the dial 210.

Next, a user interface displayed through the display 120 of the AVN system will be described with reference to FIGS. 3A to 3B.

Figure 3A:
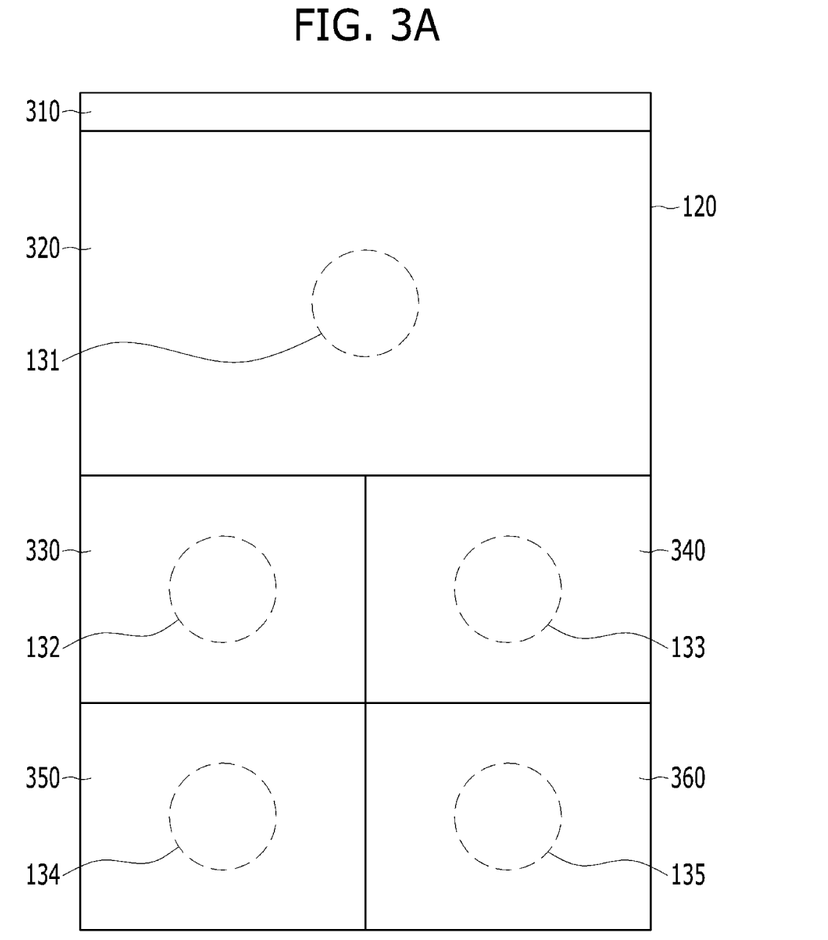
FIG. 3A is a view illustrating an example of the region configuration of an AVN side display according to an embodiment of the present invention.

FIG. 3A is a view illustrating an example of the region configuration of an AVN side display according to an embodiment of the present invention.

Referring to FIG. 3A, the display 120 of the AVN system 100 may be divided into a plurality of regions according to the display function. For example, state information other than the controlled function capable of being controlled through the AVN system may be displayed in an uppermost region 310.

An upper region 320 immediately below the uppermost region 310 may have the largest area in the display 120. In addition, lower regions 330, 340, 350 and 360 in which four different controlled functions are displayed may be disposed below the upper region 320.

Of course, it is apparent to those skilled in the art that division into such regions is an example and the other forms may be used as necessary. For example, the sizes of at least some of the regions may be dynamically changed.

In addition, knob recognizers 131, 132, 133, 134 and 135 capable of recognizing whether the detachable knob 200 is attached may be disposed on the back surface of each region. Therefore, the controller 160 of the AVN system 100 may determine whether the detachable knob 200 is attached and the attachment position. Although the knob recognizers 131, 132, 133, 134 and 135 are shown as being located at the centers of the regions in FIG. 3a, this is an example and the positions of the knob recognizers 131, 132, 133, 134 and 135 may be changed according to the controlled function for each region and the user interface displayed thereby, and more or less knob recognizers 131, 132, 133, 134 and 135 may be disposed.

Figure 3B:
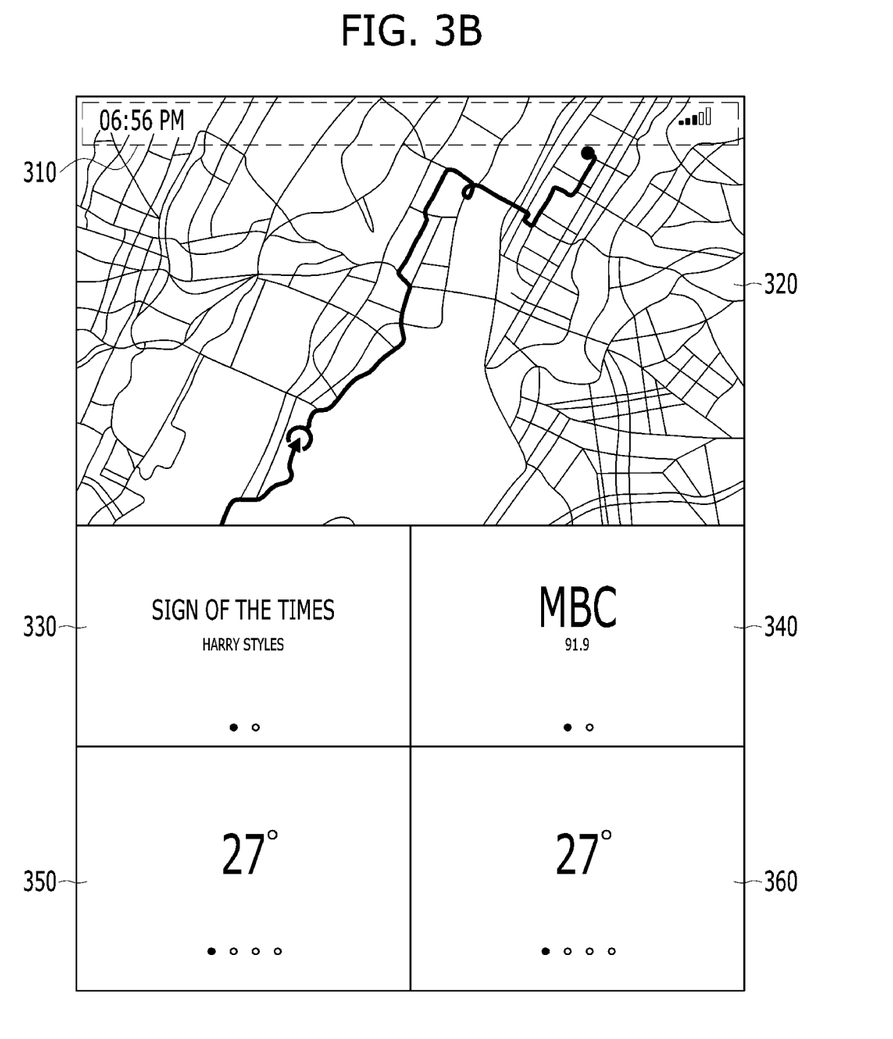

FIG. 3B is a display state view showing an example of a form in which display information is displayed according to the region configuration of FIG. 3A. Referring to FIG. 3B, time information and wireless communication sensitivity information are displayed in the uppermost region 310 and a navigation guidance screen may be displayed in the upper region 320. In addition, played media information may be displayed in the upper-left-side lower region 330, radio information may be displayed in the upper-right-side lower region 340, and driver's seat air conditioning information and passenger seat air conditioning information may be respectively displayed in the lower-left-side lower region 350 and the lower-right-side lower region 360. It is apparent to those skilled in the art that arrangement of the controlled functions of the regions is an example and different arrangements may also be possible.

Hereinafter, a process of performing the interworking function between the detachable knob and the display of the AVN system based on the above-described configuration of the apparatus will be described with reference to FIG. 4.

Figure 4:
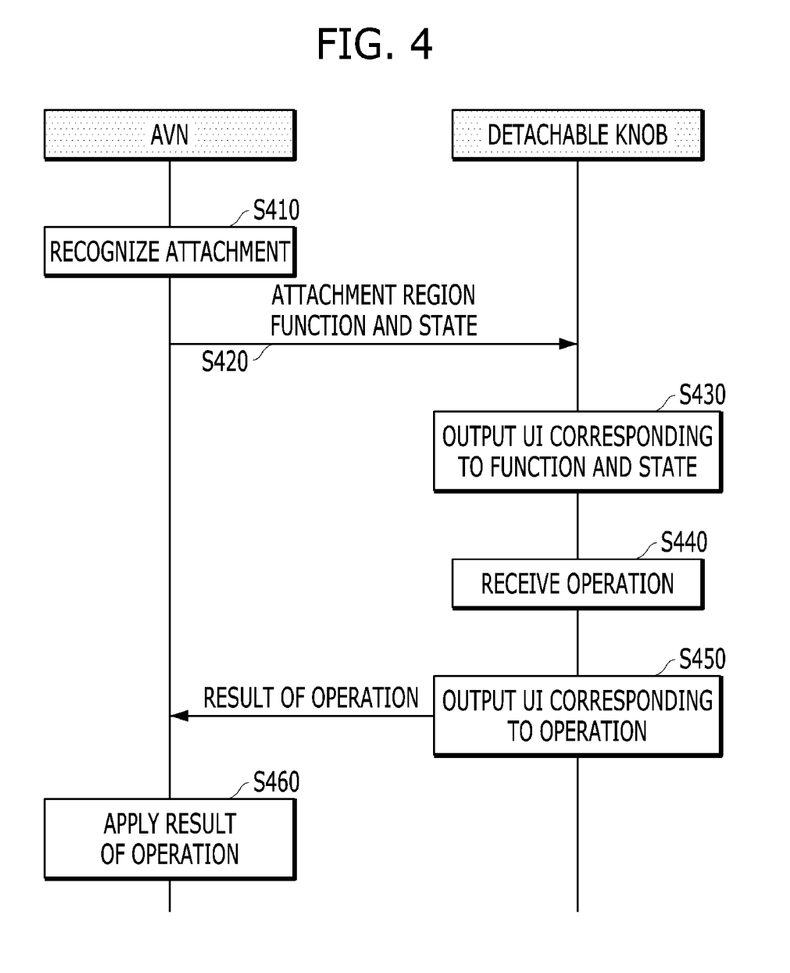
FIG. 4 is a flowchart illustrating an example of a process of operating an in-vehicle display system including a detachable knob according to an embodiment of the present invention.

FIG. 4 is a flowchart illustrating an example of a process of operating an in-vehicle display system including a detachable knob according to an embodiment of the present invention.

Referring to FIG. 4, as the detachable knob 200 is attached to the display 120 of the AVN system 100, the AVN system 100 may detect the position where the detachable knob 200 is attached through the knob recognizer 130 (S410).

The AVN system 100 may transmit information on the controlled function of the display region corresponding to the attached position to the detachable knob 200 through the wireless communication unit 150 (S420). Here, the information on the controlled function may include the type of the controlled function and the current state information of the function.

The detachable knob 200 may output a graphical user interface UI corresponding to the controlled function and the current state on the display 220 based on the received information (S430).

Thereafter, when operation of a user, such as operation of the dial 210 or touch input or push command input on the display 220, is received (S440), the detachable knob 200 may output the user interface corresponding to the operation on the display 220 (that is, change in state information output through the user interface) (S450). In addition, information on operation (e.g., an operation amount, a control amount, an operation direction, a changed function type, etc.) may be transmitted to the AVN system 100 through the wireless communication unit 250.

The AVN system 100 may apply the result of operation to the controlled function based on the information on the operation (S460).

Hereinafter, a detailed example of the process described above with reference to FIG. 4 will be described with reference to FIGS. 5A to 6.

Figure 5A:
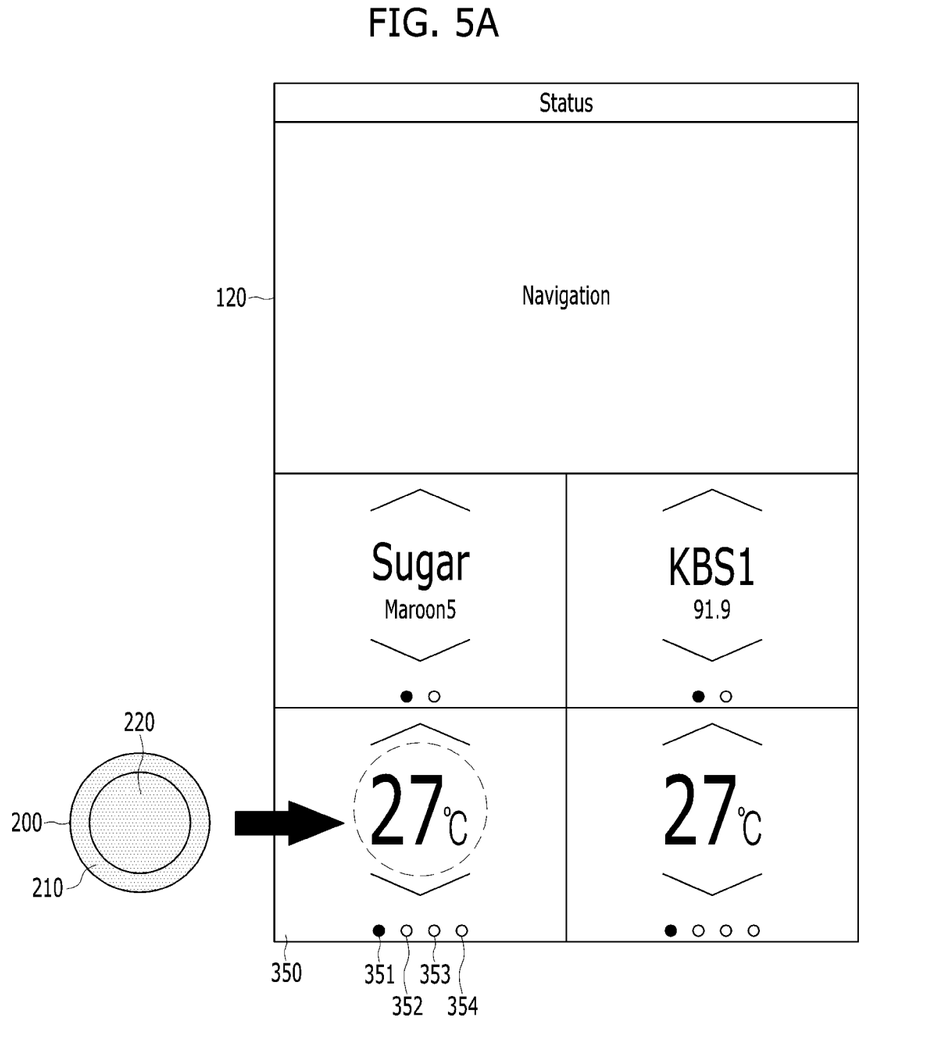
FIG. 5A is a view showing an example of a form in which a detachable knob according to an embodiment of the present invention is attached to an AVN display.

FIG. 5A is a view showing an example of a form in which a detachable knob according to an embodiment of the present invention is attached to an AVN display.

Referring to FIG. 5A, the entire region configuration is similar to that shown in FIG. 3B. In FIG. 5A, assume that the detachable knob 200 is attached in the lower-left-side lower region 350 and the driver's seat air conditioning function is displayed in the lower-left-side lower region 350 as the controlled function.

The driver's seat air conditioning function may include target temperature setting, air volume setting, fan direction setting, hot wire/ventilation setting of a seat as sub functions. The target temperature setting UI is displayed in the lower-left-side lower region 350 before the detachable knob 200 is attached. In addition, a plurality of indicators 351, 352, 353 and 354 indicating the number of sub functions and a sub function which is currently being operated is displayed. For example, when the target temperature setting function corresponds to the leftmost indicator 351, as shown in the figure, a visual effect different from those of the other indicators 352, 353 and 354 may be applied to the leftmost indicator 351.

Figure 5B:
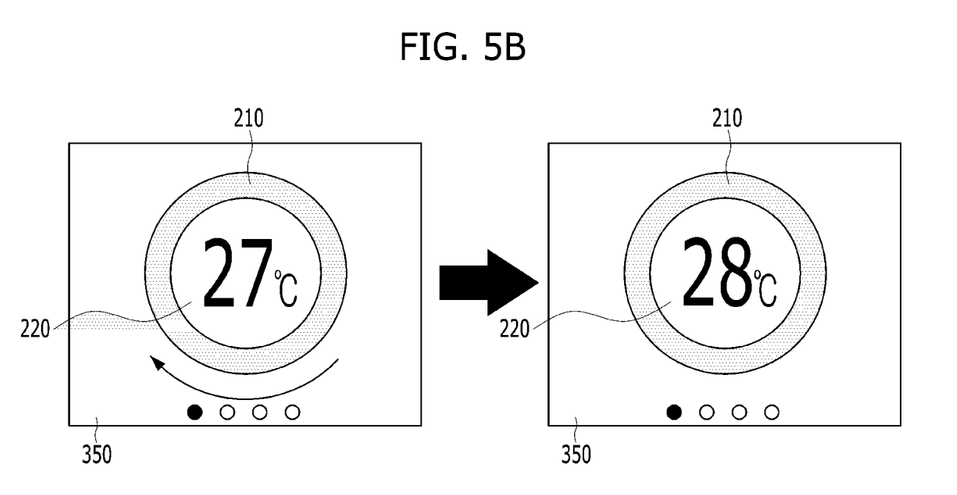
FIG. 5B is a view showing an example of display state change according to rotation of a detachable knob according to an embodiment of the present invention.

FIG. 5B is a view showing an example of display state change according to rotation of a detachable knob according to an embodiment of the present invention.

When the detachable knob 200 is attached in the lower-left-side lower region 350, the AVN system 100 detects that the detachable knob 200 is attached in the lower-left-side lower region 350 through the knob recognizer 130, and transmits the controlled function corresponding to the region 350 and the current state information of the function to the detachable knob 200 through the wireless communication unit 150.

Accordingly, it can be seen that the current target temperature is set to 27° C. through the detachable knob 200 in the target temperature setting function of the driver's seat air conditioning control functions. As shown in the left side of FIG. 5B, the UI corresponding to the target temperature setting function is displayed on the display 220 of the detachable knob 200. Here, when the dial 210 rotates clockwise, as shown in the right side of FIG. 5b, the target temperature may rise according to the rotation amount and at least one of rotation amount information, changed final target temperature information or target temperature change amount may be transmitted to the AVN system 100 through the wireless communication unit 250.

Figure 5C:
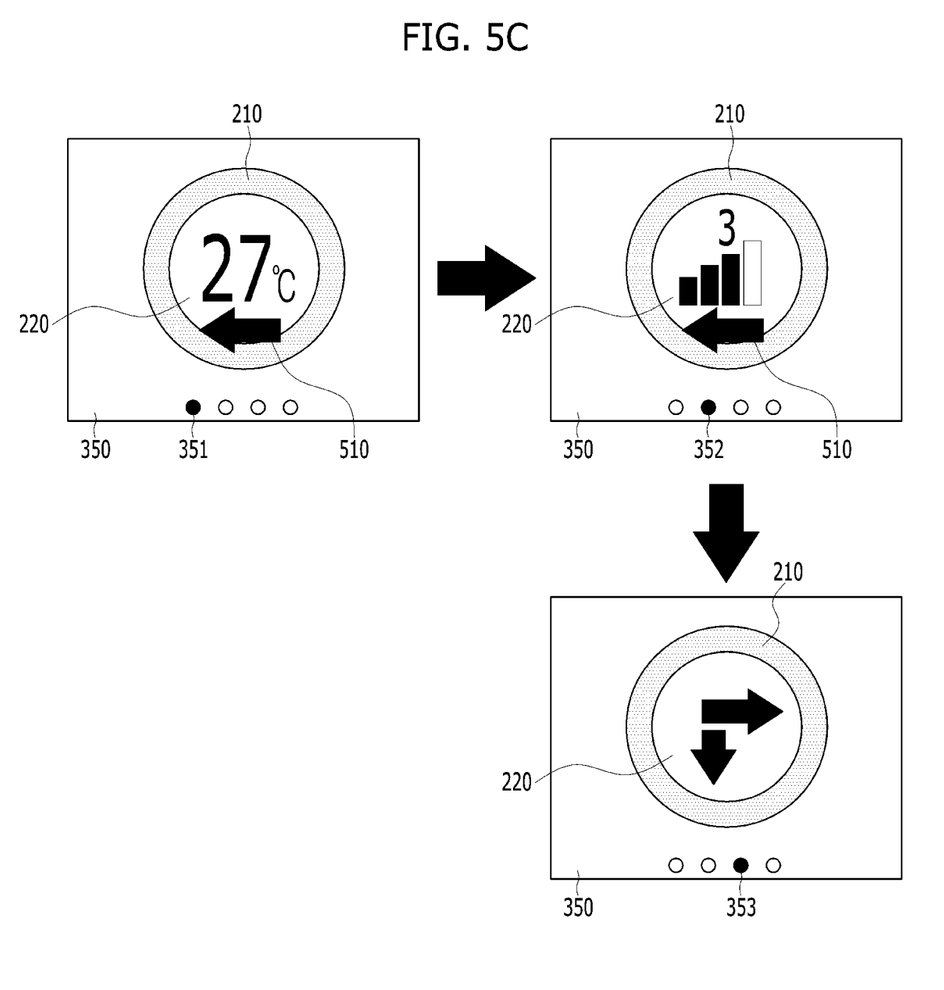
FIG. 5C is a view showing an example of display state change according to touch of a detachable knob according to an embodiment of the present invention.

FIG. 5C is a view showing an example of display state change according to touch of a detachable knob according to an embodiment of the present invention. In FIG. 5c, assume that the display 220 of the detachable knob 200 is a touchscreen.

As shown in the upper left side of FIG. 5C, when a flicking touch command directed to the left on the display 220 of the detachable knob 200 is input, the target temperature setting function among the sub functions of the driver's seat air conditioning function may be changed to the air volume setting function. Therefore, the visual effect applied to the first indicator 351 may be applied to the second indicator 352. In this state, when the dial 210 rotates, the air volume may be changed.

In addition, when a flicking touch command directed to the right in the situation shown in the upper right side of FIG. 5C is input, the situation may return to the situation shown in the upper left side of FIG. 5C and, when a flicking touch command directed to the left is input, the air volume setting function among the sub functions of the driver's seat air conditioning function may be changed to the fan direction setting function. Therefore, the visual effect applied to the second indicator 352 may be applied to the third indicator 353. In this state, when the dial 210 rotates, the fan direction may be changed.

In addition, different types of touch commands (e.g., simple touch) may be input instead of the flicking touch input. Unlike FIG. 5C, when the display 220 includes a push button function, the sub function may be changed by pushing the display 220 instead of flicking touch input.

Meanwhile, in FIGS. 5A to 5C, any one of the plurality of sub functions assigned for each region is displayed before the detachable knob is displayed and, when the detachable knob is attached, the sub function becomes a control target. In contrast, according to another embodiment of the present invention, before the detachable knob is attached, summary information (e.g., a current state) of each of the plurality of sub functions assigned to a corresponding region may also be displayed and, when the detachable knob is attached, as shown in FIG. 5A, a temperature which is a sub function to be controlled may be displayed in the region 350 or output of information may be restricted only in the corresponding region.

FIG. 6, which includes FIGS. 6A-6D, is a view showing an example of display state change according to various controlled objects of a detachable knob according to an embodiment of the present invention.

Figure 6A:
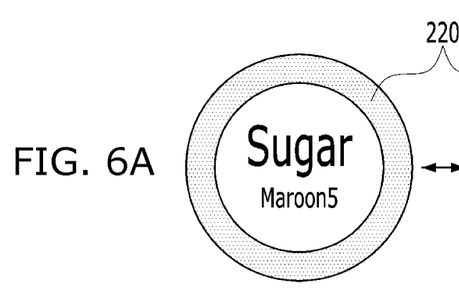
FIGS. 6A-6D, is a view showing an example of display state change according to various controlled objects of a detachable knob according to an embodiment of the present invention.

First, when the detachable knob 200 is attached in the upper-left lower region 330 of the display 120 of the AVN system 100, as shown in FIG. 6A, a playlist of a media player function may be displayed on the display 220 of the detachable knob 200. In this state, when the dial 210 rotates, played music may be changed.

Figure 6B:
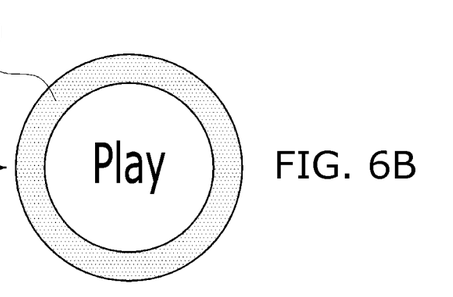

In addition, when a command for changing a sub function (e.g., flicking touch or push button operation) is input, as shown in FIG. 6B, a play state change function may be called. In this state, when the dial 210 is operated, the volume may be changed.

Figure 6C:
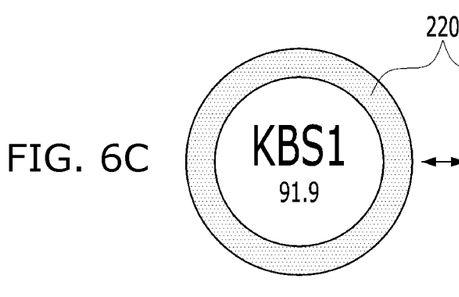

Next, when the detachable knob 200 is attached in the upper-right lower region 340 of the display 120 of the AVN system 100, as shown in FIG. 6C, a channel list of a radio function may be displayed on the display 220 of the detachable knob 200. In this state, when the dial 210 rotates, a plurality of pre-stored channels may be sequentially changed.

Figure 6D:
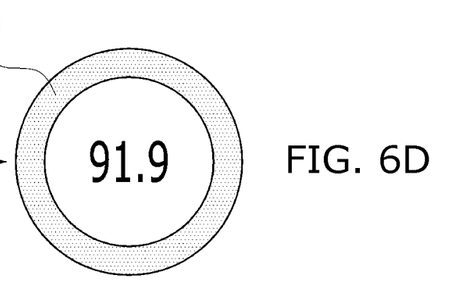

In addition, when a command for changing a sub function (e.g., flicking touch or push button operation) is input, as shown in FIG. 6D, a frequency tune function may be called. In this state, when the dial 210 is operated, frequency search may be changed.

The above-described method of operating the controlled function is an example and is applicable to any function which may be changed by inputting a user command in the vehicle (e.g., a drive selector such as sports/eco/normal mode, a seat position, lighting setting of an ambient light, transmission setting, etc.).

Figure 7A:
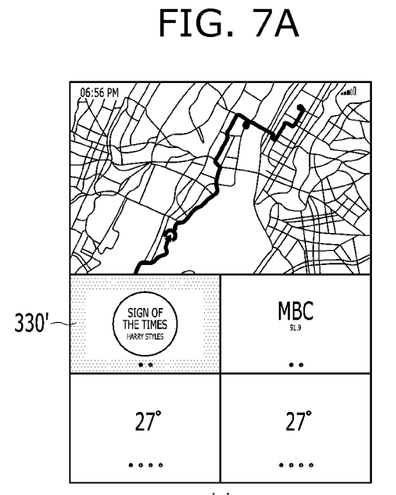
FIGS. 7A, 7B and 7C, is a view showing an example of state change of an AVN side display according to attachment of a detachable knob according to an embodiment of the present invention.
Figure 7B:
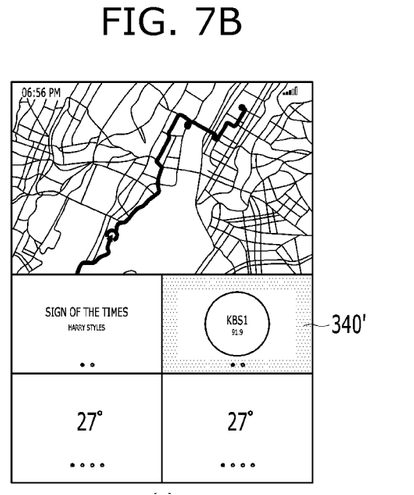
Figure 7C:
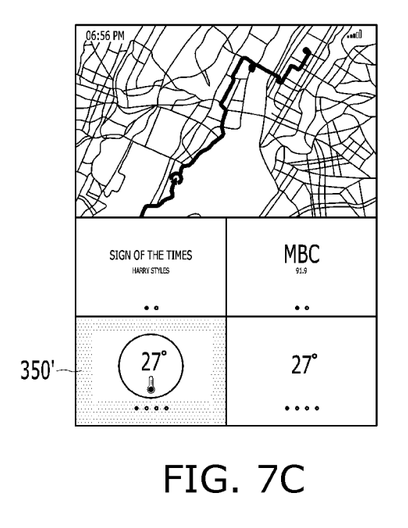

FIG. 7 is a view showing an example of state change of an AVN side display according to attachment of a detachable knob according to an embodiment of the present invention.

Referring to FIG. 7, the display states of the AVN system are displayed. At this time, in FIGS. 7A to 7C, although the detachable knob 200 is attached in any one of the plurality of regions of the display 120, the detachable knob 200 is not shown.

As shown in FIG. 7, when the detachable knob 200 is attached in an arbitrary region, a predetermined visual effect indicating that the detachable knob 200 is attached in the corresponding region may be applied and the visual effect may differ between regions.

For example, when the detachable knob 200 is attached in the upper-left-side lower region 330' as shown in FIG. 7A, a first color may be applied to the corresponding region 330', and, when the detachable knob 200 is attached in the upper-right-side lower region 340' as shown in of FIG. 7B, a second color may be applied to the corresponding region 340'. In addition, when the detachable knob 200 is attached to the lower-left-side lower region 350' as shown in of FIG. 7C, a third color may be applied to the corresponding region 350'. Here, if the color is applied to the region, in which the detachable knob is attached, the visual effect having the same color may be applied on the display of the detachable knob. In particular, when the visual effect of the same color is applied to the boundary region of the edge of the region, in which the detachable knob is attached, and the edge of the display of the detachable knob, the user can easily recognize the region, in which the detachable knob is attached, and the boundary thereof.

Meanwhile, the display 220 of the detachable knob 200 may be implemented as a transparent display. In this case, when the display 220 is attached to the display 120 of the AVN system 100, the user may confirm information on the attached region of the display 120 through the transparent display 220. Accordingly, the information on the controlled function in the form displayed in FIGS. 5B and 5C may be displayed on the display 120 of the AVN system 100 to be visible to the user through the transparent display 220, instead of being displayed on the transparent display 220.

If the size of the transparent display 220 is less than that of the attached region on the display 120 of the AVN system 100, when attachment of the detachable knob 200 of the AVN system 100 is recognized, at least one of the size and shape of the information previously displayed in the region may be adjusted in consideration of the size of the transparent display 220.

For example, in FIG. 5A, the size of displayed text "27° C." is similar to the total outer diameter of the detachable knob 200 before the detachable knob 200 is attached in the lower-left-side lower region 350, but may be adjusted to be less than the size of the transparent display 220 after the detachable knob is attached in the region 350. Therefore, the user may confirm the temperature information having the adjusted size through the transparent display 220, similarly to that shown in FIG. 5B. Of course, this is related to size change and the embodiment is not limited thereto. As the detachable knob 200 is attached, information arranged in a vertical direction in the form of a list of items may be arranged in the grid form, that is, an information arrangement form may be changed.

In addition, in this case, instead of displaying text information on the transparent display, the visual effect may be applied to the region, in which the detachable knob 200 is attached, for example, color may be applied to the edge or the entire transparent display.

The in-vehicle control apparatus according to at least one embodiment of the present invention can provide a more convenient user interface by interworking with a detachable knob.

In particular, in the present invention, since a controlled object is determined according to the position of the detachable knob attached to the display and the result of control depends on operation of the detachable knob, it is possible to control various controlled objects on the large-screen display through the sense of operation of the physical knob.

The effects of the present invention are not limited to the above-described effects and other effects which are not described herein may be derived by those skilled in the art from the above description of the embodiments of the present invention.

The invention can also be embodied as computer readable code on a computer readable recording medium. The computer readable recording medium is any data storage device that can store data which can thereafter be read by a computer system. Examples of the computer readable recording medium include read-only memory (ROM), random-access memory (RAM), CD-ROMs, magnetic tapes, floppy disks, and optical data storage devices.

The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A method of controlling a vehicle using a detachable knob, the method comprising:
   detecting whether the detachable knob is attached to a first display of an audio video navigation (AVN) system, the first display including a plurality of regions;
   transmitting information on a controlled function corresponding to one of the plurality of regions to which the detachable knob is attached, the information being transmitted from the AVN system to the detachable knob;
   outputting a first user interface corresponding to the information on the controlled function on a second display of the detachable knob;
   transmitting result information according to an operation of the detachable knob, the result information transmitted from the detachable knob to the AVN system;
   controlling the controlled function based on the result information in the AVN system; and
   giving a same visual effect via the first user interface displayed on an edge region of the second display and a region of the first display to which the detachable knob is attached.

2. The method according to claim 1, further comprising, in response to the operation of the detachable knob, outputting a second user interface that corresponds to the operation on the second display.

3. The method according to claim 1, wherein the operation comprises operation of a dial or operation of the second display as a touchscreen.

4. The method according to claim 3,
   wherein the operation comprises operation of a dial;
   wherein the detachable knob has a cylindrical appearance; and
   wherein the dial has a toroidal shape surrounding the second display having a circular shape.

5. The method according to claim 3, wherein the operation includes a rotation of the dial or a touch command input through the touchscreen.

6. The method according to claim 5, wherein the controlling includes:
   changing a control amount of the controlled function according to rotation of the dial; or
   changing a type of the controlled function according to the touch command input.

7. The method according to claim 1, wherein the information on the controlled function includes a type of the controlled function or current state information of the controlled function.

8. The method according to claim 1, further comprising displaying different controlled functions in different ones of the plurality of regions.

9. The method according to claim 1, wherein the detachable knob is attached to the first display using a magnet.

10. The method according to claim 1, further comprising:
    displaying a plurality of pieces of sub function information corresponding to a plurality of controlled functions via the first display before the detachable knob is attached; and restricting output of at least some information of a region, in which the detachable knob is attached, on the first display, when the detachable knob is attached.

11. The method according to claim 1,
wherein the second display comprises a transparent display; and
wherein the method further comprises modifying information displayed in a region of the first display to which the detachable knob is attached, so as to correspond to a size and shape of the transparent display.

12. The method according to claim 11, wherein the first user interface includes a transparent color effect corresponding to the controlled function.

13. A control apparatus comprising:
an audio video navigation (AVN) system including a first display that includes a plurality of regions; and
a detachable knob attached to the first display, the detachable knob including a second display and an operation unit;
wherein, when detecting that the detachable knob is attached to the first display, the AVN system is configured to transmit information on a controlled function corresponding to a region of the first display to which the detachable knob is attached;
wherein the detachable knob is configured to output a first user interface that corresponds to the information on the controlled function on the second display;
wherein the detachable knob is configured to transmit result information according to an operation to the AVN system when the operation unit is operated;
wherein the AVN system is configured to control the controlled function based on the result information; and
wherein a same visual effect is given to a region of the first display to which the detachable knob is attached and an edge region of the second display.

14. The control apparatus according to claim 13, wherein the detachable knob is configured to output a second user interface corresponding to the operation on the second display when the operation unit is operated.

15. The control apparatus according to claim 13,
wherein the operation unit includes a dial;
wherein the detachable knob has a cylindrical appearance; and
wherein the dial has a toroidal shape surrounding the second display, which has a circular shape.

16. The control apparatus according to claim 13, wherein the operation unit includes a dial or wherein the second display is implemented as a touchscreen.

17. The control apparatus according to claim 16, wherein the operation includes a rotation of the dial or a touch command input through the touchscreen.

18. The control apparatus according to claim 17, wherein the AVN system is configured to change a control amount of the controlled function according to rotation of the dial or to change a type of the controlled function according to the touch command input.

19. A method of controlling a vehicle using a detachable knob, the method comprising:
detecting whether the detachable knob is attached to a first display of an audio video navigation (AVN) system, the first display including a plurality of regions;
transmitting information on a controlled function corresponding to one of the plurality of regions to which the detachable knob is attached, the information being transmitted from the AVN system to the detachable knob;
outputting a first user interface corresponding to the information on the controlled function on a second display of the detachable knob;
transmitting result information according to an operation of the detachable knob, the result information transmitted from the detachable knob to the AVN system wherein the operation comprises operation of a dial;
outputting a second user interface that corresponds to the operation on the second display;
controlling the controlled function based on the result information in the AVN system; and
giving a same visual effect via the first user interface displayed on an edge region of the second display and a region of the first display to which the detachable knob is attached.

20. The method according to claim 19,
wherein the detachable knob has a cylindrical appearance; and
wherein the dial has a toroidal shape surrounding the second display having a circular shape.

* * * * *